US011028775B2

(12) United States Patent
Mackin et al.

(10) Patent No.: US 11,028,775 B2
(45) Date of Patent: Jun. 8, 2021

(54) BLEED AIR BOOSTED ENGINE OIL COOLER

(71) Applicant: The Boeing Company, Chicago, IL (US)

(72) Inventors: Steve G. Mackin, Bellevue, WA (US); Samuel J. Tutko, Covington, WA (US)

(73) Assignee: The Boeing Company, Chicago, IL (US)

( * ) Notice: Subject to any disclaimer, the term of this patent is extended or adjusted under 35 U.S.C. 154(b) by 173 days.

(21) Appl. No.: 16/110,043

(22) Filed: Aug. 23, 2018

(65) Prior Publication Data

US 2020/0063660 A1 Feb. 27, 2020

(51) Int. Cl.
| | |
|---|---|
| *F02C 7/14* | (2006.01) |
| *F01D 25/20* | (2006.01) |
| *F01M 5/00* | (2006.01) |
| *F02C 6/08* | (2006.01) |
| *F02C 7/18* | (2006.01) |
| *F02C 9/18* | (2006.01) |
| *F02C 3/32* | (2006.01) |

(52) U.S. Cl.
CPC ............... *F02C 7/14* (2013.01); *F01D 25/20* (2013.01); *F01M 5/002* (2013.01); *F02C 6/08* (2013.01); *F02C 7/18* (2013.01); *F02C 9/18* (2013.01); *F02C 3/32* (2013.01); *F05D 2260/213* (2013.01); *F05D 2260/601* (2013.01); *F05D 2260/98* (2013.01)

(58) Field of Classification Search
CPC ...... F02C 7/14; F02C 7/18; F02C 3/32; F02C 6/08; F05D 2260/213; F05D 2260/601; F01D 25/20; F01D 25/18
See application file for complete search history.

(56) References Cited

U.S. PATENT DOCUMENTS

| | | | | |
|---|---|---|---|---|
| 5,269,135 | A * | 12/1993 | Vermejan | F02C 7/14 60/226.1 |
| 5,438,823 | A | 8/1995 | Loxley | |
| 6,487,847 | B1 * | 12/2002 | Snow | F02C 7/236 60/235 |
| 8,261,527 | B1 * | 9/2012 | Stearns | F02C 7/06 60/39.08 |
| 2003/0136103 | A1 * | 7/2003 | Reuter | F01D 25/20 60/39.08 |
| 2015/0361887 | A1 * | 12/2015 | Stearns | F02C 7/06 60/772 |
| 2016/0024968 | A1 * | 1/2016 | Stearns | F02C 7/185 60/39.08 |
| 2017/0335769 | A1 | 11/2017 | Boujida | |

(Continued)

*Primary Examiner* — Gerald L Sung
*Assistant Examiner* — Rene D Ford
(74) *Attorney, Agent, or Firm* — Felix L. Fischer

(57) ABSTRACT

An aircraft engine system has a turbofan engine with a lubricating oil system. An oil pump is connected to pump oil from the oil tank through a cooling circuit to the turbofan engine. The cooling circuit has a bleed air boosted engine oil cooler assembly with a liquid/air heat exchanger (LAHEX) connected to an oil inlet conduit and receiving fan air from a high bypass fan of the turbofan engine as the cooling working fluid. The LAHEX is connected to an oil exit conduit. An ejector downstream of the LAHEX receives bleed air from a compressor section of the turbofan engine. The ejector draws the fan air through the LAHEX.

20 Claims, 4 Drawing Sheets

(56) References Cited

U.S. PATENT DOCUMENTS

2017/0335770 A1* 11/2017 Glahn ...................... F02C 3/04
2018/0038243 A1    2/2018 Rambo
2019/0072035 A1*  3/2019 Peace ...................... F02K 3/115

* cited by examiner

BLEED AIR BOOSTED ENGINE OIL COOLER

BACKGROUND INFORMATION

Field

Implementations of the disclosure relate generally to the field of oil cooling systems for turbofan engines and more particularly to a system for engine surge bleed air introduction into a primary nozzle of an ejector downstream of a heat exchanger to reduce pressure thereby enhancing flow through the heat exchanger.

Background

Turbofan engines typically require cooling of engine oil. Prior art systems employ one or more liquid/liquid heat exchangers (LLHEX) to cool the oil using fuel to reject the heat from the oil. Engine oil is fed to an input for a first side the of the LLHEX and fuel being pumped from the fuel tanks to the engine is fed through the second side before being routed to the fuel metering unit (FMU) for use in powering the engine. In certain systems a liquid/air heat exchanger (LAHEX) is employed to provide additional cooling of the oil with bypass air from the engine fan provided to the air side of the LAHEX. An inlet scoop for the air side of the LAHEX is provided in the fan duct to collect fan bypass air after the fan section and a discharge duct returns air to the fan duct. To capture sufficient flow through the LAHEX the inlet scoop protrudes into the fan duct to recover dynamic pressure through ram air effect in introducing the inlet air. The discharge duct may also protrude into the fan duct to lower the discharge pressure to further enhance flow through the LAHEX. However, both these features result in fan duct pressure losses with associated impact on engine performance Use of flush inlet or outlet configurations requires a significantly larger heat exchanger to provide the necessary cooling.

As current alternates, a variable inlet scoop retracting into the fan duct wall may be employed to mitigate fan duct pressure loss when the requirement for oil heat rejection is lower. Similarly, the discharge duct may be retractable or may need to be flush to further mitigate fan duct pressure loss. However, the added mechanical complexity and associated system weight of such retractable ducts may be undesirable.

A critical performance point for the oil cooling system is whenever the throttle is reduced, such as reduction for a cruise condition after an extended climb. The oil is at one of its hottest conditions but, due to reduction in engine power and associated fuel flow, there is less fuel flowing to the LLHEX and bypass fan air is reduced due to the lower thrust thereby lowering flow for the effectiveness of the LAHEX, both of which impact the ability to cool the oil.

SUMMARY

Implementations disclosed herein provide an aircraft engine system having a turbofan engine with a lubricating oil system. An oil pump is connected to pump oil from the lubricating oil system through a cooling circuit to the turbofan engine. The cooling circuit has a bleed air boosted engine oil cooler assembly with a liquid/air heat exchanger (LAHEX) connected to an oil inlet conduit and receiving fan air from a high bypass fan of the turbofan engine as the cooling working fluid. The LAHEX is connected to an oil exit conduit. An ejector downstream of the LAHEX receives bleed air from a compressor section of the turbofan engine. The ejector draws the fan air through the LAHEX.

The implementations disclosed provide a method for cooling turbofan engine oil by monitoring engine core speed with a core speed sensor. Engine oil is provided through an inlet conduit for cooling in a LAHEX and exits through the exit conduit. If core speed is decelerating a control input is issued to a bleed valve to open the valve bleeding surge bleed air from an engine compressor section through an inlet conduit to an ejector in an outlet duct of a bleed air boosted engine oil assembly.

BRIEF DESCRIPTION OF THE DRAWINGS

The features, functions, and advantages of the bleed air boosted engine oil cooler can be achieved independently in various implementations of the present disclosure or may be combined in yet other implementations further details of which can be seen with reference to the following description and drawings.

DETAILED DESCRIPTION

Implementations disclosed herein provide a bleed air boosted engine oil cooler assembly with a LAHEX having an ejector using engine bleed air to reduce pressure in an air side discharge duct to improve efficiency of the LAHEX. Fan bypass air is used for the air side inlet to the LAHEX. An inlet duct and a discharge duct, both having apertures flush with the engine fan duct, reduce fan duct pressure drop. A reduction in the LAHEX size can be achieved since air will be forced over the fins and the pressure drop across the fins can be higher. A critical operating condition for the oil cooling system is accommodated in that whenever the engine decelerates, air is bled from the compressors to avoid stalls. This surge bleed air is usually dumped overboard with no additional use. The present implementation provides control capability to employ the surge bleed air, which is a byproduct of the condition that is causing the critical sizing condition for the LAHEX, to augment the bleed air boosted engine oil cooler assembly efficiency thereby increasing overall system efficiency.

Figure 1:
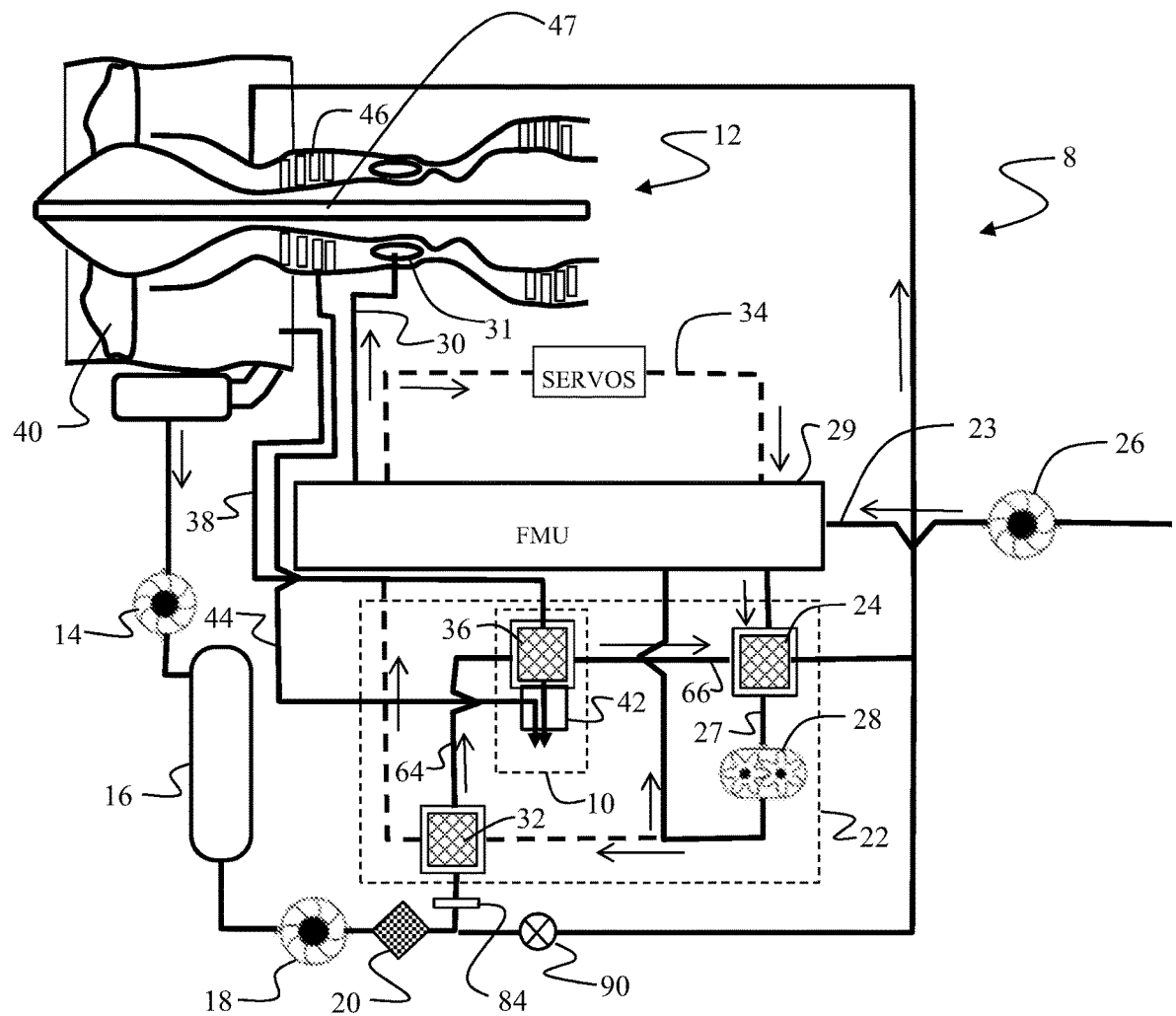
FIG. 1 is a schematic representation of a turbofan engine system employing an implementation of the bleed air boosted engine oil cooler.

Referring to the drawings, FIG. 1 shows a general arrangement of an aircraft engine system 8 employing an implementation of the bleed air boosted engine oil cooler assembly 10. A turbofan engine 12 has a lubrication oil system such as a scavenge pump 14 and an oil tank 16 for lubricating oil used in the engine. An oil pump 18 with associated filter 20 is connected to pump the oil from the oil tank 16 through a cooling circuit 22. At least one heat exchanger provides either liquid to air or liquid to liquid cooling in the cooling circuit. In the exemplary arrangement of FIG. 1, at least one LLHEX provides oil cooling employing fuel, pumped from the aircraft fuel tanks through feed lines 23 through a fuel metering unit (FMU) 29 for use by the engine combustors 31, as the cooling working fluid. For the example shown, a main fuel/oil LLHEX 24 is connected to receive fuel from a first stage fuel pump 26 through feed line 23 and provides the fuel through a second feed line 27 to a second stage fuel pump 28 supplying the fuel to combustor supply inlet 30. A servo fuel heater LLHEX 32 may also be employed to bypass fuel from the second stage fuel pump 28 through a servo loop 34. Both the main fuel/oil LLHEX 24 and servo fuel heater LLHEX 32 provide oil cooling.

For the exemplary arrangement disclosed, the bleed air boosted engine oil cooler assembly 10 is connected in the oil cooling circuit 22 between main fuel/oil LLHEX 24 and servo fuel heater LLHEX 32. The main fuel/oil LLHEX 24 and servo fuel heater LLHEX 32 may serve to supplement the cooling provided by the bleed air boosted engine oil cooler assembly 10. The bleed air boosted engine oil cooler assembly 10 employs a LAHEX 36 having an air side receiving fan air (represented by arrow 38) from the high bypass fan 40 of the turbofan engine 12 as the cooling working fluid. An ejector 42 downstream of the LAHEX 36 receives engine bleed air (represented by arrow 44) from the compressor section 46 of the turbofan engine 12.

Figure 2:
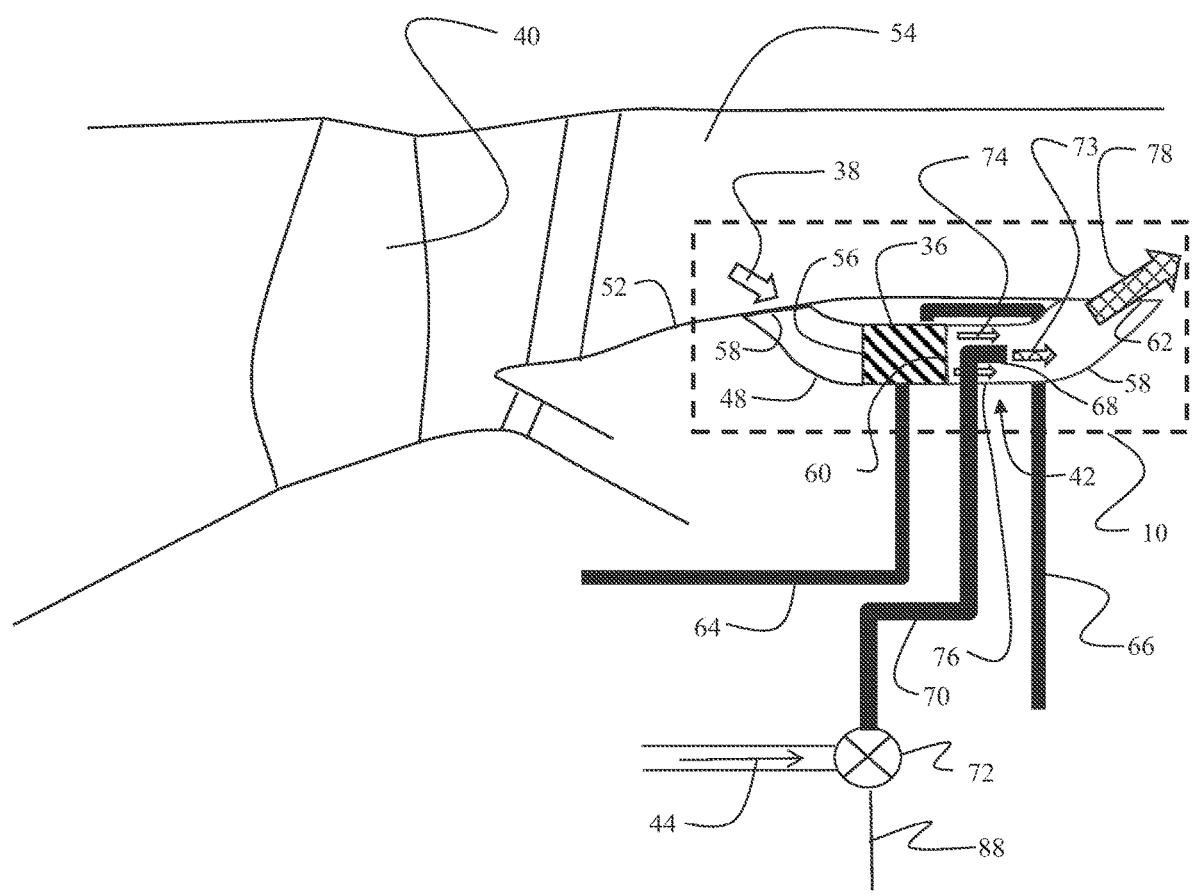
FIG. 2 is a detailed depiction of the bleed air boosted engine oil cooler.

As seen in FIG. 2, the bleed air boosted engine oil cooler assembly 10 employs an inlet duct 48 having an inlet aperture 50 flush with a wall 52 of the fan duct 54. The LAHEX 36 is connected to the inlet duct 48 at an air side inlet 56. An outlet duct 58 extends from an air side outlet 60 of the LAHEX 36 to a flush outlet aperture 62 in the wall 52 of the fan duct 54. Oil is provided to the liquid side of the LAHEX 36 through an oil inlet conduit 64, connected in the exemplary implementation to the servo fuel heater LLHEX 32, and cooled oil exits the LAHEX 36 through an oil exit conduit 66, connected in the exemplary implementation to the main fuel/oil LLHEX 24. In implementations without a servo fuel heater LLHEX 32, the oil inlet conduit 64 is connected directly to the oil pump 18 and/or filter 20. In implementations without a main fuel/oil LLHEX 24 the oil exit conduit 66 may be connected to directly feed the turbofan engine.

The outlet duct 58 incorporates the ejector 42 having a primary nozzle 68 ejecting engine bleed air 44 received through bleed conduit 70. A bleed valve 72 controls flow in the bleed conduit 70, as will be described in greater detail subsequently. The bleed valve has at least a first open position providing flow through the bleed conduit and a closed position preventing flow through the bleed conduit. Ejected bleed air (represented by arrow 73) exiting the primary nozzle 68 entrains heated exit fan air (represented by arrows 74) in a secondary nozzle 76 pumping fan air 38 through the LAHEX 36. Forcing the fan air through the LAHEX with the ejector allows higher pressure drop across the fins increasing efficiency or reducing size of the LAHEX. The combined mixed flow (represented by arrow 78) exhausts through the outlet aperture 62 into the fan duct 54.

Figure 3:
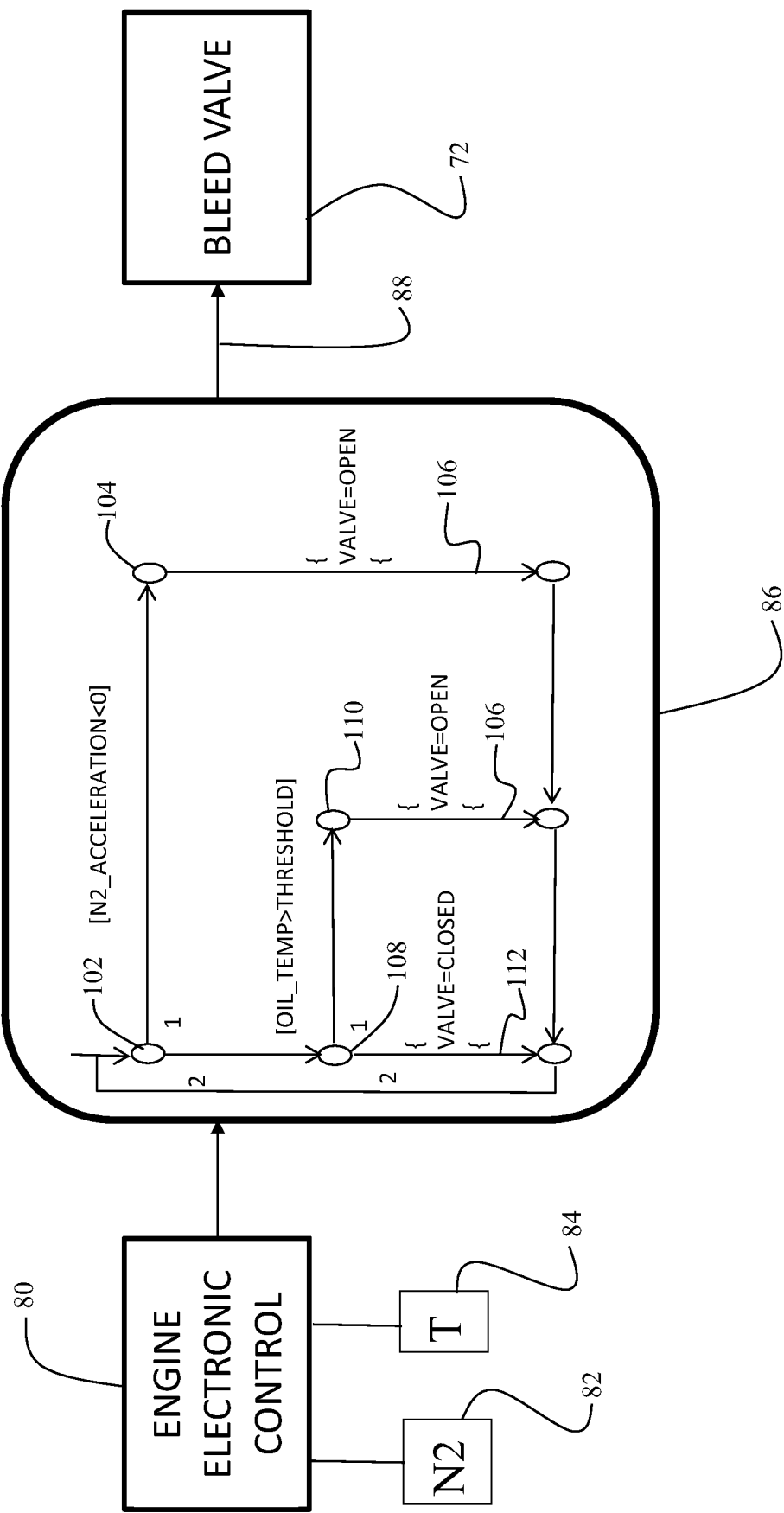
FIG. 3 is a block diagram of a control module for control of the bleed valve operation; and, FIG. 4 is a flow chart of a method for oil cooling in a turbofan engine using the disclosed implementations.

Control of bleed valve 72 is accomplished as shown in FIG. 3. An engine electronic control 80 receives input from a core speed sensor 82 and an oil temperature sensor 84. A valve control module 86 determines if the core 47 is decelerating (N2 acceleration<0), node 102. If affirmative, node 104, an open bleed valve signal 106 is issued on control input 88 to the bleed valve 72. If core speed is not decelerating, the valve control module determines if oil temperature exceeds a threshold temperature value, node 108. If affirmative, node 110, the valve open control signal is issued allowing bleed air flow. If core speed is not decelerating and oil temperature does not exceed the threshold, a valve closed control signal 112 is issued on control input 88 preventing flow of bleed air.

The control logic employed in valve control module 86 means the bleed valve 72 will open during a deceleration of the core 47 to protect operability margin even if the oil temperature is not hotter than the trigger threshold. This is acceptable because the cooling circuit 22 employs a bypass valve 90 (as seen in FIG. 1), or alternatively the individual heat exchangers in the circuit may have individual bypass valves, with separate logic module bypassing the oil cooling circuit 22 or heat exchangers to protect the oil from getting too cold. No interaction between these two systems is necessary.

Figure 4:
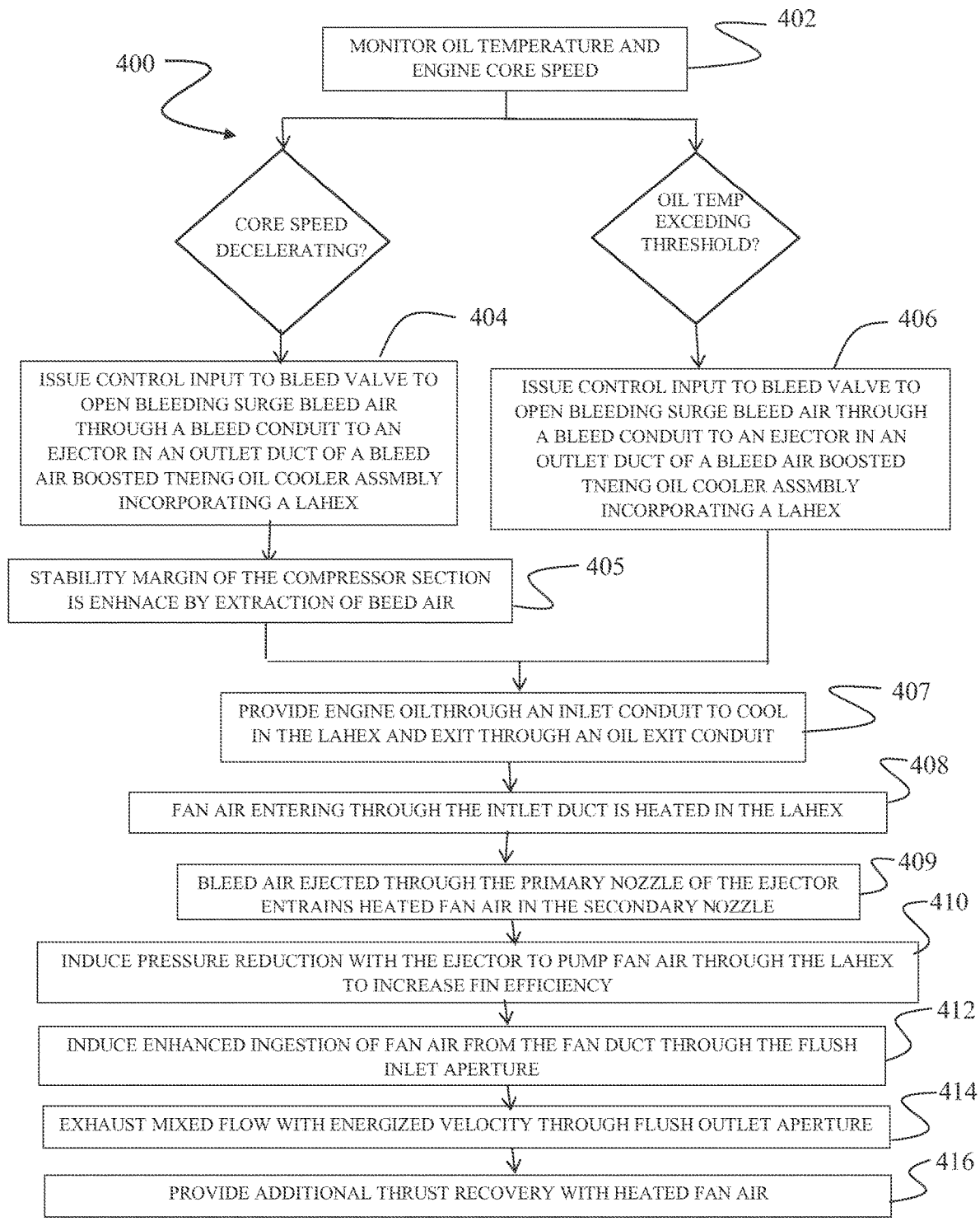

A method 400 for cooling turbofan engine oil employing the implementations disclosed herein is shown in FIG. 4. Engine oil temperature is monitored with an oil temperature sensor 84 and engine core speed is monitored with a core speed sensor 82, step 402. If core speed is decelerating a control input 88 to the bleed valve 72 is issued to open the valve bleeding surge bleed air through a bleed conduit 70 to an ejector 42 in the outlet duct 58 of a bleed air boosted engine oil cooler assembly 10, step 404. Stability margin of the compressor section 46 is enhanced by extraction of the bleed air 44, step 405. If temperature of the engine oil exceeds a threshold, the control input 88 is issued to the bleed valve 72 to open the valve, step 406. Engine oil provided through the oil inlet conduit 64 is cooled in the LAHEX 36 and exits through the oil exit conduit 66, step 407. Fan air 38 entering through the inlet duct 48 is heated in the LAHEX 36, step 408. Bleed air ejected through the primary nozzle 68 of the ejector 42 entrains heated fan air 74 drawn through the LAHEX 36 in the secondary nozzle 76, step 409. Pressure reduction induced by the ejector 42 in the outlet duct 58 of the bleed air boosted engine oil cooler assembly 10 causes pumping of the fan air through the LAHEX 36 increasing fin efficiency, step 410, and further induces enhanced ingestion of fan air 38 from the fan duct 54 through the flush inlet aperture 50 into the inlet duct 48, step 412. Energized velocity of the mixed flow 78 exhausts the mixed flow through the flush outlet aperture 62 of the outlet duct 58 into the fan duct 54, step 414. The heated fan air 74 introduced into the mixed flow 78 provides additional thrust recovery in the fan duct 54, step 416.

Having now described various implementations of the disclosure in detail as required by the patent statutes, those skilled in the art will recognize modifications and substitutions to the specific implementations disclosed herein. Such modifications are within the scope and intent of the present disclosure as defined in the following claims.

What is claimed is:
1. An aircraft engine system comprising:
a turbofan engine having a core including a compressor section and further having a lubricating oil system;
an oil pump connected to pump oil from the lubricating oil system through a cooling circuit to the turbofan engine, said cooling circuit having a bleed air boosted engine oil cooler assembly with
a liquid/air heat exchanger (LAHEX) connected to an oil inlet conduit and receiving fan air from a fan of the turbofan engine as a cooling working fluid, said LAHEX connected to an oil exit conduit, and
an ejector downstream of the LAHEX receiving bleed air from the compressor section of the turbofan engine, said ejector drawing the fan air through the LAHEX;

an outlet duct from an air side outlet of the LAHEX connected to exhaust the fan air, said ejector having a primary nozzle ejecting the bleed air into the outlet duct;

a bleed valve connected through a bleed conduit to the primary nozzle, said bleed valve having a closed position preventing flow of bleed air to the bleed conduit and an open position allowing flow of bleed air to the bleed conduit, a core speed sensor detecting speed of the core;

an oil temperature sensor; and a valve control module receiving input from the core speed senor and oil temperature sensor and, responsive to a deceleration of the core, issuing a control signal to the bleed valve placing the bleed valve in the open position to protect operability margin even if oil temperature is not hotter than a trigger threshold.

2. The aircraft engine system as defined in claim 1 wherein the cooling circuit further comprises at least one additional heat exchanger connected to provide oil cooling to supplement the bleed air boosted engine oil cooler assembly.

3. The aircraft engine system as defined in claim 2 wherein the at least one additional heat exchanger comprises a main fuel/oil LLHEX connected to provide oil cooling employing fuel, pumped from aircraft fuel tanks through feed lines for use by engine combustors, as a liquid cooling working fluid through a first feed line receiving fuel from a fuel pump supplying the fuel to a combustor supply inlet, the main fuel/oil LLHEX connected to the oil exit conduit.

4. An aircraft engine system comprising:

a turbofan engine having a lubricating oil system;

an oil pump connected to pump oil from the lubricating oil system through a cooling circuit to the turbofan engine, said cooling circuit having a bleed air boosted engine oil cooler assembly with a liquid/air heat exchanger (LAHEX) connected to an oil inlet conduit and receiving fan air from a fan of the turbofan engine as a cooling working fluid, said LAHEX connected to an oil exit conduit, an ejector downstream of the LAHEX receiving bleed air from a compressor section of the turbofan engine, said ejector drawing the fan air through the LAHEX, and a main fuel/oil LLHEX connected to provide oil cooling employing fuel, pumped from aircraft fuel tanks through feed lines for use by engine combustors, as a liquid cooling working fluid through a first feed line receiving fuel from a fuel pump supplying the fuel to a combustor supply inlet, the main fuel/oil LLHEX connected to the oil exit conduit to provide oil cooling to supplement the bleed air boosted engine oil cooler assembly; and a servo fuel heater LLHEX connected to bypass fuel from a second stage fuel pump through a servo loop, said servo fuel heater LLHEX connected to the oil inlet conduit.

5. The aircraft engine system as defined in claim 4 wherein the bleed air boosted engine oil cooler assembly further comprises:

an inlet duct at an air side inlet of the LAHEX connected to a fan duct to receive the fan air; and, an outlet duct from an air side outlet of the LAHEX connected to the fan duct to exhaust the fan air, said ejector having a primary nozzle ejecting the bleed air into the outlet duct.

6. The aircraft engine system as defined in claim 5 wherein the inlet duct has an inlet aperture flush with the fan duct.

7. The aircraft engine system as defined in claim 5 wherein the outlet duct has an outlet aperture flush with the fan duct.

8. The aircraft engine system as defined in claim 5 further comprising a bleed valve connected through a bleed conduit to the primary nozzle, said bleed valve having a closed position preventing flow of bleed air to the bleed conduit and an open position allowing flow of bleed air to the bleed conduit, and a valve control module responsive to a deceleration of a core of the turbofan engine issuing a control signal to the bleed valve placing the bleed valve in the open position.

9. The aircraft engine system as defined in claim 8 wherein the valve control module is further responsive to a signal from a temperature sensor issuing the control signal to the bleed valve placing the bleed valve in the open position upon exceeding a threshold temperature.

10. A bleed air boosted engine oil cooler assembly comprising a liquid/air heat exchanger (LAHEX) connected to an oil inlet conduit and receiving fan air from a fan of a turbofan engine as a cooling working fluid, said LAHEX connected to an oil exit conduit, an ejector downstream of the LAHEX receiving bleed air from a compressor section of the turbofan engine, said ejector drawing the fan air through the LAHEX;

an outlet duct from an air side outlet of the LAHEX connected to exhaust the fan air, said ejector having a primary nozzle ejecting the bleed air into the outlet duct;

a bleed valve connected through a bleed conduit to the primary nozzle, said bleed valve having a closed position preventing flow of bleed air to the bleed conduit and an open position allowing flow of bleed air to the bleed conduit, a core speed sensor detecting speed of the core of the turbofan engine;

an oil temperature sensor; and a valve control module receiving input from the core speed senor and oil temperature sensor and, responsive to a deceleration of the core, issuing a control signal to the bleed valve placing the bleed valve in the open position to protect operability margin even if oil temperature is not hotter than a trigger threshold temperature.

11. The bleed air boosted engine oil cooler assembly as defined in claim 10 further comprising:

an inlet duct at an air side inlet of the LAHEX connected to a fan duct to receive the fan air; and, the outlet duct is connected to the fan duct to exhaust the fan air.

12. The bleed air boosted engine oil cooler assembly as defined in claim 11 wherein the inlet duct has an inlet aperture flush with the fan duct.

13. The bleed air boosted engine oil cooler assembly as defined in claim 11 wherein the outlet duct has an outlet aperture flush with the fan duct.

14. The bleed air boosted engine oil cooler assembly as defined in claim 10 wherein the valve control module is further responsive to a signal from the temperature sensor issuing the control signal to the bleed valve placing the bleed valve in the the open position upon exceeding the trigger threshold temperature.

15. A method for cooling turbofan engine oil of a turbofan engine comprising:

monitoring engine core speed with a core speed sensor;

monitoring engine oil temperature with an oil temperature sensor;

providing the engine oil through an inlet conduit for cooling in a bleed air boosted engine oil cooler assembly having a liquid/air heat exchanger (LAHEX), the LAHEX receiving fan air from a fan of the turbofan engine as a cooling working fluid, said engine oil exiting through an exit conduit, wherein the bleed air boosted engine oil cooler assembly has an ejector receiving bleed air from a compressor section of the turbofan engine, said ejector drawing the fan air through the LAHEX with an outlet duct from an air side outlet of the LAHEX connected to exhaust the fan air, said ejector having a primary nozzle ejecting the bleed air into the outlet duct and a bleed valve is connected through a bleed conduit to the primary nozzle, said bleed valve having a closed position preventing flow of bleed air to the bleed conduit and an open position allowing flow of bleed air to the bleed conduit, and a valve control module receiving input from the core speed sensor and oil temperature sensor; and issuing a control input from the valve control module to the bleed valve to open the bleed valve, bleeding the bleed air from an engine compressor section through the bleed conduit to the ejector in the outlet duct of the bleed air boosted engine oil cooler assembly if the engine core speed is decelerating to protect operability margin even if the oil temperature is not hotter than a trigger threshold temperature.

16. The method as defined in claim 15, further comprising enhancing a stability margin of the engine compressor section by extraction of the bleed air.

17. The method as defined in claim 15 further comprising:

issuing the control input to the bleed valve to open the bleed valve if the engine oil temperature exceeds the trigger threshold temperature.

18. The method as defined in claim 15 further comprising:

entraining heated fan air drawn through the LAHEX in a secondary nozzle using the bleed air ejected through the primary nozzle of the ejector to create a mixed flow;

inducing pressure reduction by the ejector in the outlet duct of the bleed air boosted engine oil cooler assembly and causing pumping of fan air through the LAHEX, increasing fin efficiency and inducing enhanced ingestion of the fan air from a fan duct through a flush inlet aperture into an inlet duct of the bleed air boosted engine oil cooler assembly.

19. The method as defined in claim 18 further comprising exhausting the mixed flow with energized velocity through a flush outlet aperture of the outlet duct into the fan duct, said heated fan air introduced into the mixed flow providing additional thrust recovery in the fan duct.

20. The method as defined in claim 18 further comprising recovering additional thrust by introduction of heated fan air into the mixed flow.

* * * * *